Patented June 1, 1937

2,082,526

UNITED STATES PATENT OFFICE 2,082,526

PRODUCTION OF ALUMINA SUBSTANTIALLY FREE FROM SILICIC ACID FROM ALKALINE EARTH ALUMINATES

Josef Stöhr and Erich Reidt, Waldshut, Germany, assignors to Lonza Elektrizitatswerke und Chemische Fabriken Aktiengesellschaft (Gampel), Basel, Switzerland No Drawing. Application April 10, 1936, Serial No. 73,810. In Germany April 20, 1935

7 Claims. (Cl. 23—141)

The object of the invention is an improvement in the known process for the production of alumina by lixiviation of alkaline earth aluminates with alkali carbonate solution, preferably hot, and subsequent precipitation of the alumina from the solution thus obtained, e. g., by means of carbonic acid. A known and extremely unfavourable disadvantage of this process consists in the fact that in the working up of the silicic acid containing alkaline earth aluminates, as these practically always come into question, the silicic acid at present also goes more or less into solution, and in the succeeding precipitation, accordingly constitutes an impurity in the alumina, so that it is necessary to remove the silicic acid which goes into solution before the precipitation of the alumina, e. g., according to the process of Patent No. 1,978,823, by precipitation with alkali.

It has been found that in dissolving calcium aluminate in solutions of alkali carbonate, e. g., soda, with different samples of calcium aluminate, which show corresponding contents of silicic acid, quite different amounts of silicic acid go into solution. A closer examination of this phenomenon led to the surprising discovery that in calcium aluminate silicic acid may be present in different forms, of which one is difficultly soluble or almost insoluble, whilst the other can be dissolved up relatively easily in soda solution or a solution of similar alkali carbonate.

It was further found that the easily soluble form of silicic acid is transformed into a difficultly soluble form by oxidation of the alkaline earth aluminate at a raised temperature, and that thereby the amount of soluble silicic acid contained in the aluminate can be so far reduced that there can be directly obtained from the solution of the so treated alkaline earth aluminate in alkali carbonate by precipitation, e. g., with carbonic acid, alumina sufficiently free from silicic acid to be suitable, for example, for electrolysis in the fused state, so that a previous removal of the silicic acid from the aluminate solution, for example, according to the above described process, by precipitation with chalk, can be avoided, and only in a few cases is a precipitation of the silicic acid from the solution, e. g., with lime, desired.

The action of the oxidizing treatment appears to depend upon an alteration in the structure of the silicic acid, possibly through oxidation, so that the silicic acid is changed into an insoluble form.

In practicing the invention, by way of example, the alkaline earth aluminate is roasted in the presence of air or other oxidizing gas, for example, in a muffle furnace or retort. The roasting process can be carried out at temperatures of about 800 to 1,400° C., preferably 800–900° C., and according to the condition of the starting materials, for periods from ¼ of an hour to several hours, e. g., two hours.

By such pre-treatment of the alkaline earth aluminate, before dissolving in alkali carbonate solution, there is avoided not only the expense of chalk and working costs associated with the subsequent precipitation of the silicic acid, but there is also avoided the loss of alumina involved in this precipitation wholly or at least to a substantial extent.

Further advantages, especially with reference to the yield of alumina, can be obtained, as has further been found, if steps are taken to maintain within certain limits the ratio between alkaline earth oxide and alumina in the alkaline earth aluminate to be brought into solution.

It has in fact been ascertained that the solubility of alkaline earth aluminates, for example, of calcium aluminate, is strongly reduced, if the ratio between alkaline earth oxide (calculated as CaO), and $Al_2O_3$ in the aluminate is greater than 3:1 or smaller than 0.9:1.

Exhaustive researches have elucidated the hitherto unknown fact that aluminates with a content of CaO less than 0.9 molecule of CaO to one molecule of $Al_2O_3$ and those with a content of CaO of more than three molecules of CaO to one molecule of $Al_2O_3$ are so difficultly soluble in alkali carbonate solutions that by treatment of the aluminate with hot soda solution only less than 60% of alumina goes into solution, but on the contrary, between these limits (0.9 and three molecules of CaO per molecule of $Al_2O_3$) the solubility of alumina is distinctly better, and with amounts of 1.12 to 2.2 molecules of CaO per molecule of $Al_2O_3$, 90% and over of the $Al_2O_3$ present can be brought into solution, as is shown by the following table:—

| Mols CaO to each Mol. $Al_2O_3$ | Percentage yield of alumina |
|---|---|
| 0.79 | 49.7 |
| 0.89 | 53.8 |
| 1.09 | 77.5 |
| 1.14 | 92.6 |
| 1.48 | 97.7 |
| 1.76 | 95.5 |
| 1.95 | 96.0 |
| 2.12 | 93.2 |
| 2.33 | 72.5 |
| 2.89 | 68.2 |
| 3.26 | 54.2 |

If, therefore, there is treated by the present process calcium aluminate in which the ratio between $Al_2O_3$ and CaO exceeds the limit given above for good solubility of $Al_2O_3$, there is obtained an alumina of high purity, but in an uneconomical way on account of the loss of $Al_2O_3$ in the lixiviation process.

In the present invention, therefore, there is preferably employed for the lixiviation those alkaline earth aluminates whose composition lies within the limits given above, and this is preferably realized by producing the aluminate, for example by Patent 1,916,697, in such manner as to obtain a composition of the product as indicated above.

In addition to the favourable yield of pure, almost silica free, alumina, the form of the process of this invention described in the foregoing paragraph shows also the advantage that the use, undesired on economical grounds, of large amounts of alkaline earths in the production of the alkaline earth aluminate, is avoided.

This is a special advantage, for example, in working with highly impure bauxite, as, for example, the Hessian bauxite. This raw material requires for its conversion into calcium aluminate a large amount of lime. If the lime is not limited in proportion to a maximum of 2–2.4 molecules of CaO to each molecule of $Al_2O_3$, the aluminate so obtained is not only poorly soluble, but by the employment of excessive amounts of chalk, the working up of these raw materials is placed in jeopardy, as they will only stand a very small cost.

In the calculation of the number of molecules of CaO which should be present for each molecule of $Al_2O_3$, it has to be observed that also for each molecule of $SiO_2$, two molecules of CaO must be present.

Finally, it has been ascertained that when operating in the manner described, the concentration of the liquor used for lixiviating the alkaline earth aluminate can be maintained at up to about 18% alkali carbonate in contrast to only 8–12% in the known process without increase in the percentage of silicic acid going into solution. There are obtained in this way alkali aluminate solutions which contain 74–76 grams $Al_2O_3$ instead of 55–57 grams, whereby the liquor volume per ton of dissolved alumina is reduced by about 25%.

*Example 1*

50 grams calcium aluminate were in one case left unroasted, and in the other case roasted for two hours at 1100° C., and were then lixiviated with a 10% solution of sodium carbonate. The composition of the alkaline earth aluminates, and the results of the experiment, are given in the following table:—

| Calcium aluminate | Percentage composition | |
| --- | --- | --- |
|  | Unroasted | Roasted |
| $SiO_2$ | 1.56 | 1.04 |
| $TiO_2$ | 0.30 | 0.20 |
| $Fe_2O_3$ | 1.76 | 1.28 |
| $Al_2O_3$ | 53.04 | 52.22 |
| CaO | 45.40 | 44.40 |
| Results of the lixiviation: | | |
| Dissolved $Al_2O_3$ | 25.080 gms. | 25.460 gms. |
| Yield of $Al_2O_3$ | 94.7 percent | 97.5 percent |
| Dissolved $SiO_2$ | 0.410 gms. | 0.0396 gms. |
| Dissolved $SiO_2$ | 52.5 percent | 4.10 percent |
| Dissolved $SiO_2$ per litre | 0.744 gms. | 0.080 gms. |
| Dissolved $SiO_2$ as a percentage of Dissolved $Al_2O_3$ | 1.64 percent | 0.16 percent |

The liquor from the unroasted aluminate must be treated for the removal of silicic acid with 18.6–22.3 kg. excess of lime per cubic metre, that is to say, with 9.3–11.1 grams of lime per 500 cc. so that losses in alumina must be taken into account.

The liquor from the roasted alkaline earth aluminate contains so little silicic acid that the lime treatment could be avoided. By a direct treatment of this solution of alumina by passing carbon dioxide through it, an alumina very low in silicic acid is obtained.

We declare that what we claim is:—

1. In a process for the production of alumina, practically free from silicic acid, by lixiviation of alkaline earth aluminate containing silicic acid soluble in alkali carbonate with a solution of alkali carbonate, separation of the alkali metal aluminate solution from the undissolved residue, and precipitation of the alumina, the step which consists in subjecting the alkaline earth aluminate before lixiviation to an oxidation treatment with an oxygen containing gas at raised temperature.

2. In a process for the production of alumina, practically free from silicic acid by lixiviation of calcium aluminate containing silicic acid soluble in alkali carbonate with a solution of sodium carbonate, separation of the sodium aluminate solution from the undissolved residue, and precipitation of the alumina, the step which consists in subjecting the calcium aluminate before lixiviation to an oxidation treatment with an oxygen containing gas at raised temperature.

3. In a process for the production of alumina practically free from silicic acid, by lixiviation of alkaline earth aluminate containing silicic acid soluble in alkali carbonate with a solution of alkali carbonate, separation of the alkali metal aluminate solution from the undissolved residue and precipitation of the alumina, the step which consists in subjecting the alkaline earth aluminate before lixiviation to an oxidation treatment with air at a temperature between 800 and 900° C.

4. In a process for the production of alumina practically free from silicic acid, by lixiviation of alkaline earth aluminate containing silicic acid soluble in alkali carbonate with a solution of alkali carbonate, separation of the alkali metal aluminate solution from the undissolved residue, and precipitation of the alumina, the steps which consist in employing an alkaline earth aluminate which contains, besides two molecules of alkaline earth oxide to each molecule of $SiO_2$, not less than 0.9 and not more than 3 molecules of alkaline earth oxide to each molecule of $Al_2O_3$, and subjecting such alkaline earth aluminate before lixiviation to an oxidation treatment with air at raised temperature.

5. In a process for the production of alumina, practically free from silicic acid, by lixiviation of calcium aluminate containing silicic acid soluble in alkali carbonate with a solution of sodium carbonate, separation of the sodium aluminate solution from the undissolved residue, and precipitation of the alumina, the steps which consist in employing a calcium aluminate which contains, besides two molecules of CaO to each molecule of $SiO_2$, not less than 1.12 and not more than 2.2 molecules of CaO to each molecule of $Al_2O_3$, and subjecting such calcium aluminate before lixiviation to an oxidation treatment with air at raised temperature.

6. In a process for the production of alumina practically free from silicic acid, by lixiviation of alkaline earth aluminate containing silicic acid soluble in alkali carbonate with a solution of alkali carbonate, separation of the alkali metal aluminate solution from the undissolved residue and precipitation of the alumina, the step which consists in subjecting the alkaline earth aluminate to an oxidation treatment with air at a raised temperature and then lixiviating it with an alkali carbonate solution containing up to 18% of alkali carbonate.

7. In a process for the production of alumina, practically free from silicic acid, by lixiviation of calcium aluminate containing silicic acid soluble in alkali carbonate with a solution of sodium carbonate, separation of the sodium aluminate solution from the undissolved residue, and precipitation of the alumina, the step which consists in heating the calcium aluminate before lixiviation to a temperature of at least 800° in the presence of air.

JOSEF STÖHR.
ERICH REIDT.